March 15, 1927.  1,621,021
F. V. MEDYNSKI
TIRE FLAP
Filed Aug. 11, 1926
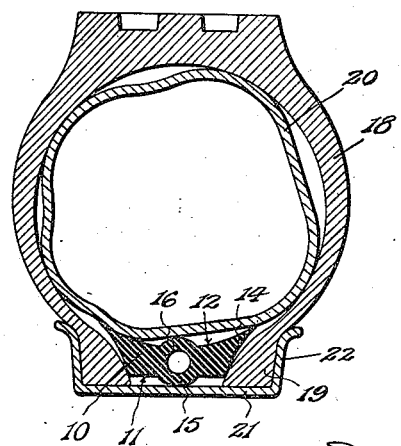
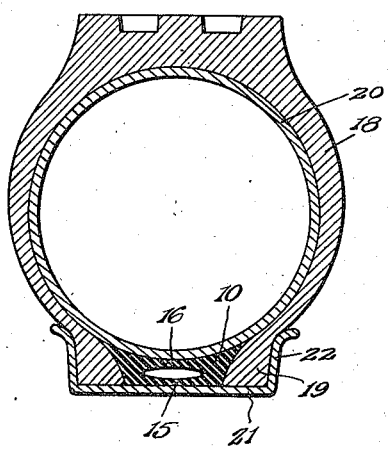
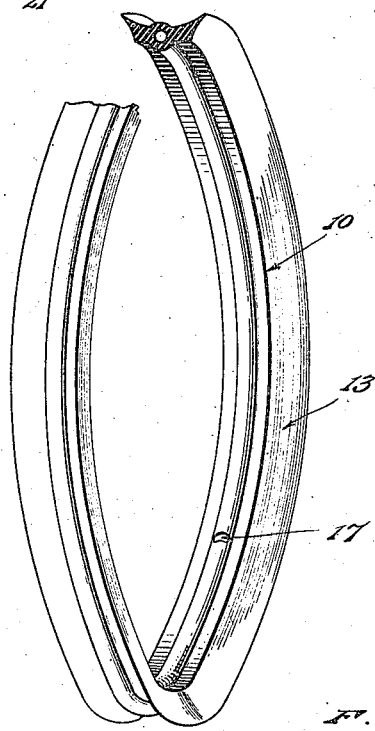
Inventor
F. V. Medynski.
By Lacey & Lacey, Attorneys Patented Mar. 15, 1927.

1,621,021

UNITED STATES PATENT OFFICE.

FRED V. MEDYNSKI, OF MEDFORD, OREGON.

TIRE FLAP.

Application filed August 11, 1926. Serial No. 128,685.

This invention relates to an improved tire flap and seeks, among other objects, to provide a device of this character which will prevent the inner tube of a tire from squeezing beneath the beads of the tire casing and will thus obviate chafing of the inner tube or bursting thereof due to uneven stretching.

A further object of the invention is to provide a flap which will effectually maintain the inner tube out of contact with the rim and will thus prevent rim-rusting of the inner tube.

A further object of the invention is to provide a flap having an expansible portion which, as the inner tube is inflated, will be flattened laterally for expanding the flap against the beads of the tire casing and accordingly wedging the beads against the side flanges of the rim to maintain tight joints between the beads and said flanges as well as tight joints between the side edges of the flap and said beads.

And the invention seeks, as a still further object, to provide a flap well adapted for general use and which may be readily applied and as easily removed.

Other objects of the invention not specifically mentioned in the foregoing will appear during the course of the following description.

In the accompanying drawings:

Figure 1 is a transverse sectional view showing my improved flap applied and illustrating the shape of the flap before the inner tube is inflated.

Figure 2 is a view similar to Figure 1, showing the shape of the flap after the inner tube is inflated.

Figure 3 is a perspective view of the flap.
In carrying the invention into effect, I employ an annular band 10. This band is formed of rubber or a suitable composition thereof and may, if desired, be reinforced by appropriately located fabric reinforcing strips vulcanized in the band. In any event, however, the band is elastic so that the band may not only stretch lineally but may also stretch transversely. The band is preferably endless, although, if desired, the band may be split, and is also preferably molded so that the natural shape of the band will be definitely pre-formed.

As best brought out in Figures 1 and 3 of the drawings, the band is provided with a flat inner face 11 and a concave outer face 12 while at its side edges, the band is provided with concave faces 13, and formed on the band to overhang the side edges thereof are lateral divergent wings 14 which are provided with feathered edges, the concave side faces of the band merging with the concave outer face 12 to define said edges.

Formed in the body of the band midway between the side edges thereof is an annular tubular spreader having an inner convex portion 15 extending below the inner flat face 11 of the band, and an oppositely disposed outer convex portion 16 extending above the outer concave face 12 of the band, the portions 15 and 16 of the spreader connecting the side portions of the body of the band and being much thinner than the body and correspondingly more flexible. Formed in the band is an opening 17 to accommodate the usual valve of an inner tube.

In Figure 1 of the drawings, I have shown the device in position within a tire before inflation thereof. The tire casing is indicated at 18, the beads of the casing at 19, and the usual inner tube at 20, while a wheel rim is conventionally shown at 21, the rim being provided with the usual side flanges 22. As will be observed, the flap is arranged to surround the rim 21 between the casing beads 19 and is, in turn, surrounded by the inner tube 20, it being noted that the side faces 13 of the band are shaped to conform to the contour of the confronting inner faces of the beads 19. In Figure 2, I have shown the shape assumed by the flap after the inner tube has been inflated. As will be observed, the flap is pressed between the beads 19 of the tire casing to seat flat at its inner face against the rim while the wings 14 are tightly pressed against the confronting faces of the beads to form closed, smooth joints between the feathered edges of the wings and the side walls of the casing. Thus, the inner tube cannot bulge between the flap and the side walls of the casing to cause pinching of the inner tube or chafing thereof. Furthermore, attention is particularly directed to the fact that when the inner tube is inflated, the lower convex portion 15 of the spreader of the flap is flattened against the rim while the upper convex portion 16 of said spreader is flattened by the inner tube. The spreader is thus elongated transversely with the result that the side portions of the body of the flap are wedged apart against the beads 19 of the tire casing for tightly binding said beads between the flap and the side flanges 22 of the rim. Closed joints will thus be maintained between the beads of the casing and the rim while, at the same time, said beads will be anchored to the rim and firmly held in fixed position thereon.

Having thus described the invention, what I claim is:

1. A tire flap including an annular band having a body formed with side portions and provided with a laterally extensible spreader connecting the side portions of the body.

2. A tire flap including an annular band having a body provided with side portions joined by a laterally extensible intermediate connecting portion of less thickness than the thickness of said side portions respectively.

3. A tire flap including an annular band having a body formed with side portions joined by a laterally extensible tubular spreader.

4. A tire flap including an annular band having a body formed with side portions joined by a transversely bowed connecting portion adapted to be flattened for spreading the side portions of the body apart.

5. A tire flap including an annular band having side portions provided with concave side edges, flat inner faces and concave outer faces, the said side portions having upwardly and laterally divergent wings and being joined by an intermediate laterally extensible tubular spreader having an inner convex portion extending below the flat inner faces of the side portions and an outer convex portion extending above the outer concave faces of the side portions.

In testimony whereof I affix my signature.

FRED V. MEDYNSKI. [L. S.]